UNITED STATES PATENT OFFICE.

STANISLAS SOREL, OF PARIS, FRANCE, ASSIGNOR TO JOHN F. WOOD, OF BOSTON, MASSACHUSETTS.

IMPROVEMENT IN THE MANUFACTURE OF ARTIFICIAL STONE.

Specification forming part of Letters Patent No. 100,945, dated March 15, 1870.

*To all whom it may concern:*

Be it known that I, STANISLAS SOREL, of Paris, in the Empire of France, have invented a new and useful Composition of Matter, being an Improvement in the Manufacture of Cement for Artificial Stone and other purposes.

I am the same person to whom Letters Patent of the United States, dated March 6, 1866, and numbered 53,092, were granted for an improved composition to be used as a cement. In my said patent, magnesia, by which is meant the oxide of magnesium, and chloride of magnesium, are named as essential ingredients in the composition described and patented. Upon further experiment I find that other substances may be substituted, under many circumstances, with economy and profit, in whole or in part, instead of the chloride of magnesium; and the basis of my present claim is chiefly the substitution in the formation of my cement of substances which I will mention for the chloride of magnesium. I still use the oxide of magnesium as the base, and this may be obtained either in the form of the magnesia of commerce or from the natural rock, known as "magnesite," and I still propose to combine with the ingredients which chemically form my cement, inert materials, mineral, animal, and vegetable, and also coloring matter, to produce the various kinds of stone and other products for all the uses named in my said patent.

I declare the following to be a full, clear, and exact description of the process of forming cement according to my present invention:

I throw into a furnace the natural-rock magnesite, and subject it to a red heat from one to fifty hours; I prefer for general use about twenty-four hours; I pulverize what remains. I use this product, or the magnesia of commerce, according to convenience or economy, which may depend, in part, upon the place where the cement is made, and in part upon the result proposed. I thoroughly mix with the magnesia, however obtained, any mineral substance, as sand, gravel, the dust and fragments of marble and other stones, emery or other grits, or cotton, wool, or other fibrous material, according to the result desired. The proportion of such substances varies with the work to be done, from one-half to twenty or more to one. This mixture is then moistened with a solution of either of the following substances of the density of from 20° to 30° Baumé, instead of the chloride of magnesium or the bittern-water, as described in my said patent, viz., chloride of barium, chloride of strontium, chloride of aluminium, chlorhydrate and bisulphate of ammonium, sulphate of magnesia, sulphate of aluminium, solutions of potash or of soda, or of the carbonates of these bases, as well as by the solutions of most of the double chlorides and other double salts containing salts with a magnesia basis.

These solutions can be employed singly or mixed together, or with the chloride of magnesium. They are employed more or less concentrated, according to the nature of the cement desired to be obtained.

The mixture is wet sufficiently in some cases to form a mortar, and in some cases only to produce a dampness like that of molding-sand when prepared for use. The plastic substance thus formed is then poured, pressed, or rammed into molds, or rolled or spread in slabs or sheets, or other form required, and soon sets, and forms hard, strong, and durable stone or other product, partaking of the color and qualities of the substances combined.

The cement thus made may be used for all the purposes set forth in my original patent before named, this invention being an improvement in the manufacture of the cement there described.

What I claim as my invention, and desire to secure by Letters Patent, is—

As a new product, the magnesia cement, or cement having a magnesia base, composed substantially as herein described, for the purpose of forming various substances by agglomeration or molding, as herein set forth.

SOREL.

Witnesses:
J. U. ZUST,
F. OLCOTT.